United States Patent
Enokido et al.

[11] Patent Number: 6,033,594
[45] Date of Patent: Mar. 7, 2000

[54] FERRITE AND INDUCTOR

[75] Inventors: Yasushi Enokido, Tokyo; Ryo Yokoyama, Akita; Hitoshi Saita; Naoyoshi Sato, both of Chiba, all of Japan

[73] Assignee: TDK Corporation, Tokyo, Japan

[21] Appl. No.: 09/112,055

[22] Filed: Jul. 9, 1998

[30] Foreign Application Priority Data

Jul. 16, 1997 [JP] Japan ................................... 9-207237
May 29, 1998 [JP] Japan ................................. 10-166110

[51] Int. Cl.⁷ ........................................................ H01F 1/34
[52] U.S. Cl. ................ 252/62.62; 336/233; 252/62.58; 252/62.59; 252/62.6; 252/62.63; 252/62.64
[58] Field of Search ......................... 336/233; 252/62.57, 252/62.58, 62.6, 62.63, 62.64, 62.62

[56] References Cited

U.S. PATENT DOCUMENTS

| | | | |
|---|---|---|---|
| 4,966,625 | 10/1990 | Charles | 75/234 |
| 5,871,662 | 2/1999 | Van Der Zaag et al. | 252/62.62 |

FOREIGN PATENT DOCUMENTS

| | | |
|---|---|---|
| 1-179402 | 7/1989 | Japan . |
| 3-91209 | 4/1991 | Japan . |
| 4-278502 | 10/1992 | Japan . |
| 5-326243 | 12/1993 | Japan . |
| 8-231268 | 9/1996 | Japan . |
| 8-325056 | 12/1996 | Japan . |

OTHER PUBLICATIONS

Patent Abstracts of Japan, vol. 008, No. 243 (E–277), Nov. 8, 1984, JP 59–121806, Jul. 14, 1984.

*Primary Examiner*—C. Melissa Koslow
*Attorney, Agent, or Firm*—Oblon, Spivak, McClelland, Maier & Neustadt, P.C.

[57] ABSTRACT

A ferrite which has a high initial permeability, excellent anti-stress properties and excellent temperature characteristic, obviates the use of lead, and is inexpensive, the ferrite being capable of materialize the narrow tolerance and high reliability of a resin mold type inductor without causing environmental pollution, the ferrite having a main component containing at least iron oxide and nickel oxide, an additive containing at least one of bismuth oxide, vanadium oxide, phosphorus oxide and boron oxide, a first auxiliary component containing silicon oxide and a second auxiliary component containing at least one of magnesium oxide, calcium oxide, barium oxide and strontium oxide, the content of the additive being 0.5 to 15 wt % based on the main component, the content of each auxiliary component being 0.1 to 10.0 wt % based on the main component, and a resin mold type inductor for which the above ferrite is applied.

12 Claims, 1 Drawing Sheet

FERRITE AND INDUCTOR

FIELD OF THE INVENTION

The present invention relates to a ferrite for use as a core material for an inductance element, particularly for use as a core material for a chip inductor of a resin mold type, and an inductor for which the above ferrite is applied.

PRIOR ART

In recent years, in the fields of chip inductors of a resin mold type and fixed coils of which demands are rapidly expanding in the fields of television sets, video recorders and mobile communication machines, these parts are being increasingly demanded to have a narrower tolerance and higher reliability for complying with demands for downsizing, a lighter weight and higher accuracy. Generally, a ferrite is used as a core material for the above parts. In an inductor of a resin mold type, however, a compressive stress is caused in a core by resin molding, and the inductance value of a ferrite varies depending upon a compressive stress. In a resin mold type, therefore, it is difficult to produce a high-quality inductor as a part having a small inductance tolerance. There is therefore demanded a ferrite of which the inductance change is small when an external force is exerted, i.e., which has excellent anti-stress properties. For improving the reliability of a machine and a device using an inductor as a part, it is essential to improve the reliability of the inductor per se, specifically, to decrease the temperature characteristic of a ferrite used for the inductor.

For complying with the above demands, for example, JP-A-1-179402 discloses a magnetic core for an inductor, whose inductance change is decreased, even when an external stress varies, by incorporating 1.5 to 5% by weight of at least one of $Bi_2O_3$ and $V_2O_5$ into a ferrite oxide material containing nickel as an essential component. However, the core having the above composition gives no sufficient temperature characteristic, and its inductance varies with a change in ambient temperatures.

Further, JP-A-4-278502 discloses an oxide magnetic material of which the mechanical strength is improved by incorporating 3.1 to 30% by weight of PbO and 3.1 to 30% by weight of talc into an Ni—Cu—Zn system ferrite. Since, however, the above composition itself contains highly toxic lead, it involves environmental pollution problems. Once it is distributed in markets, it is difficult to recover lead, which may result in broad environmental pollution.

JP-A-3-91209 discloses a ferrite composition which is a spinel-structured composition containing 25 to 45 mol % of $Fe_2O_3$, 0 to 20 mol % of ZnO and a balance of NiO and CuO, the NiO having a larger molar ratio than the molar ratio of CuO, and which further contains, as small-amount components, 0.1 to 5% by weight of $Bi_2O_3$ and 0.05 to 4.0% by weight of $SiO_2$. However, Example only discloses a composition obtained by incorporating 3% by weight of $Bi_2O_3$ and 0.8% by weight of $SiO_2$ into a basic composition of 38.2 mol % of $Fe_2O_3$, 50.3 mol % of NiO, 8.4 mol % of ZnO and 3.1 mol % of CuO. Further, in Example of the above JP-A-3-91209, inductance measurements are conducted to determine a change ratio in inductance under pressure. However, the above change ratio is not any ratio obtained by applying a predetermined pressure but a value obtained on the basis of inductance values obtained before and after resin molding is carried out. It is therefore questionable whether or not the inductance change ratio under a pressure of 1 t/cm$^2$ is within ±5%.

JP-A-5-326243 discloses a ferrite material obtained by incorporating $Co_3O_4$, $Bi_2O_3$ and a mixture of SiO2 with $SnO_2$ into an Ni—Cu—Zn system ferrite containing 46.5 to 49.5 mol % of $Fe_2O_3$, 5.0 to 12.0 mol % of CuO, 2.0 to 30.0 mol % of ZnO and a balance of NiO, so as to obtain the following contents of $Co_3O_4$, $Bi_2O_3$ and a mixture of $SiO_2$ with $SnO_2$, $Co_3O_4$: 0.05 to 0.60% by weight
$Bi_2O_3$: 0.50 to 2.00% by weight, and
the total content of $SiO_2$ and $SnO_2$: 0.10 to 2.00% by weight.

Further, JP-A-8-325056 discloses a ferrite material which contains, as main components, a composition containing, as oxides, 50.1 to 56 mol % of $Fe_2O_3$, 30.1 to 35 mol % of ZnO, 6 mol % or less of CuO, 4 mol % or less of MnO and a balance of NiO and which further contains, per 100 parts by weight of the above main components, 0.61 to 2 parts by weight of CoO and 0.5 to 2% by weight of $Bi_2O_3$. While the ferrite materials described in the above patent publications contain cobalt, for example, ferric oxide costs approximately tens yen per kilogram, but cobalt oxide is as expensive as approximately ten thousand yen per kilogram. For providing a less expensive inductor by reducing a production cost, therefore, it is required to develop a ferrite material which contains no cobalt or has a decreased cobalt content but which is free of a consequent decrease in characteristic.

SUMMARY OF THE INVENTION

It is an object of the present invention to provide a ferrite which has a high initial permeability, excellent anti-stress properties and excellent temperature characteristic and requires no lead and which is inexpensive.

It is another object of the present invention to materialize the narrower tolerance and higher reliability of a resin mold type inductor by means of the above ferrite and to prevent an environmental pollution.

According to the present invention, the above objects are achieved by any one of the following constitutions.

(1) A ferrite which contains a main component containing at least iron oxide and nickel oxide, an additive containing at least one of bismuth oxide, vanadium oxide, phosphorus oxide and boron oxide, a first auxiliary component containing silicon oxide and a second auxiliary component containing at least one of magnesium oxide, calcium oxide, barium oxide and strontium oxide, wherein the content of the additive based on the main component is 0.5 to 15% by weight, the content of the first auxiliary component based on the main component is 0.1 to 10% by weight and the content of the second auxiliary component based on the main component is 0.1 to 10% by weight, provided that the iron oxide is taken as $Fe_2O_3$, that the nickel oxide is taken as NiO, that the bismuth oxide is taken as $Bi_2O_3$, that vanadium oxide is taken as $V_2O_5$, that the phosphorus oxide is taken as $P_2O_5$, that the boron oxide is taken as $B_2O_3$, that the silicon oxide is taken as $SiO_2$, that the magnesium oxide is taken as MgO, that the calcium oxide is taken as CaO, that barium oxide is taken as BaO and further that the strontium oxide is taken as SrO, respectively.

(2) In the above ferrite (1), the silicon oxide as the first auxiliary component and the magnesium oxide as the second auxiliary component are contained in an amount, as a talc $[Mg_3Si_4O_{10}(OH)_2]$, of 0.5 to 8% by weight based on the main component.

(3) In the above ferrite (1) or (2), the ferrite is an Ni—Cu—Zn system ferrite.

(4) In any one of the above ferrites (1) to (3), the change ratio in inductance when a pressure of 1 t/cm² is applied is within ±5%.

(5) In any one of the above ferrites (1) to (4), the relative temperature coefficient of initial permeability in a temperature range of from −20 to +60° C. is within ±10 ppm/20 C.

(6) In the above ferrite (1) or (2), the ferrite is an Ni—Cu system ferrite.

(7) In the above ferrite (6), the change ratio in inductance when a pressure of 0.5 t/cm² is applied is within ±5%.

(8) In the above ferrite (6) or (7), the relative temperature coefficient of initial permeability in a temperature range of from −20 to +60° C. is within ±20 ppm/° C.

(9) An inductor having a core formed of any one of the above ferrites (1) to (8), the core being resin-molded.

DESCRIPTION OF THE PREFERRED EMBODIMENTS

Figure 1:
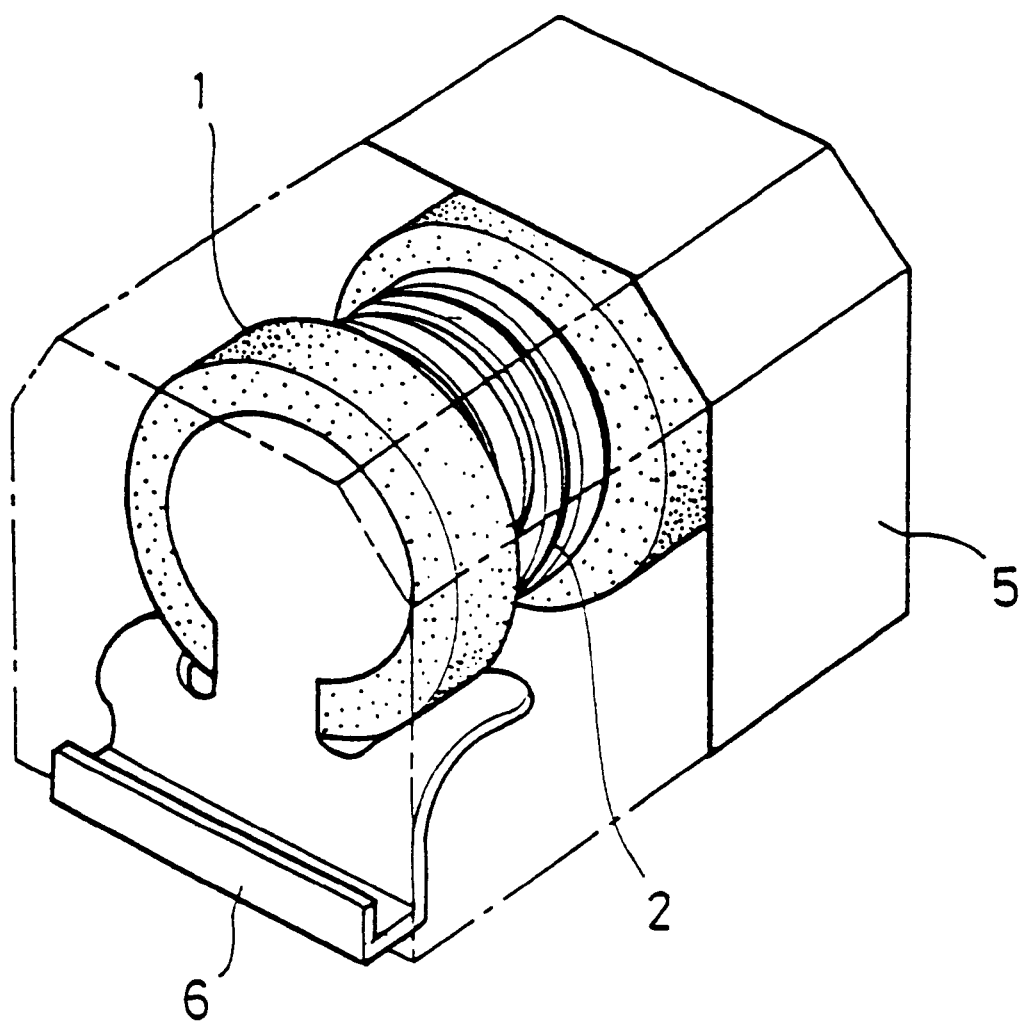
FIG. 1 is a schematic view of a constitution example of a chip inductor for which the ferrite of the present invention is applied.

The ferrite of the present invention contains a main component, an additive, a first auxiliary component and a second auxiliary component. The main component contains at least iron oxide and nickel oxide. The additive contains one or at least two members of bismuth oxide, vanadium oxide, phosphorus oxide and boron oxide. The first auxiliary component contains silicon oxide. The second auxiliary component contains one or at least two members of magnesium oxide, calcium oxide, barium oxide and strontium oxide. The contents of the above components are as follows. The content of the additive based on the main component is 0.5 to 15% by weight, preferably 0.5 to 5% by weight, the content of the first auxiliary component based on the main component is 0.1 to 10.0% by weight, and the content of the second auxiliary component based on the main component is 0.1 to 10% by weight. The above contents refer to contents obtained when the iron oxide is taken as $Fe_2O_3$ when the nickel oxide is taken as NiO, when the bismuth oxide is taken as $Bi_2O_3$, when vanadium oxide is taken as $V_2O_5$, when the phosphorus oxide is taken as $P_2O_5$, when the boron oxide is taken as $B_2O_3$, when the silicon oxide is taken as $SiO_2$, when the magnesium oxide is taken as MgO, when the calcium oxide is taken as CaO, when barium oxide is taken as BaO and further when the strontium oxide is taken as SrO, respectively.

When the content of each component is maintained in the above corresponding range, a ferrite can be well improved in the balance of initial permeability, temperature characteristic and anti-stress properties without incorporating lead which causes a detrimental effect on environments.

Specifically, the above additive is wet and spread in a grain boundary, so that a ferrite is improved in anti-stress properties in particular. Further, with an increase in the content of the above additive, the effect on an improvement in temperature characteristic improves. When the content of the additive is less than 0.5% by weight, there is obtained almost no effect on the improvement in the anti-stress properties, and the temperature characteristic deteriorates. When the content of the additive is greater than 15 wt % by weight, a ferrite varies in the characteristic and properties, and a sintered body may bleed additive during the sintering, so that one core material may be fused with another or that sintering tools such as a setter may be contaminated.

The temperature characteristic can be improved by incorporating the first auxiliary component. When the content of the first auxiliary component is less than 0.1% by weight, there is obtained almost no effect on the improvement in the temperature characteristic. When the content of the first auxiliary component exceeds 10% by weight, the initial permeability extremely decreases.

When the second auxiliary component is incorporated in addition to the first auxiliary component, the temperature characteristic and the anti-stress properties are further improved, and the effect on the improvement is remarkable as compared with a case where silicon oxide alone is incorporated. When the content of the second auxiliary component is less than 0.1% by weight, there is obtained almost no effect on the improvement in the temperature characteristic. When the content of the second auxiliary component exceeds 10% by weight, the initial permeability $\mu i$ greatly decreases.

Silicon oxide as a first auxiliary component and magnesium oxide as a second auxiliary component may be concurrently added in the form of a talc [generally, represented by $Mg_3Si_4O_{10}(OH)_2$]. In this case, the content of these components as $Mg_3Si_4O_{10}(OH)_2$ based on the main component is 0.5 to 8% by weight, preferably 1 to 5% by weight. When the above components are added in the form of talc, the temperature characteristic and the anti-stress properties can be improved by adding a small amount thereof, so that the initial permeability does not decrease, nor does the Q factor decrease. When the content of the talc is less than 0.5% by weight, there is obtained almost no effect on the improvement in the temperature characteristic, etc. When the content of the talc exceeds 8% by weight, the initial permeability $\mu i$ greatly decreases.

The ferrite of the present invention can materialize excellent anti-stress properties, temperature characteristic, etc., without containing lead. However, the present invention is not that which readily precludes a lead component, and lead may be contained in an amount, as PbO, of approximately 0.5 to 10% by weight.

The ferrite of the present invention can have excellent characteristic and properties by containing the above additive and the above auxiliary components in combination without containing cobalt oxide. When cobalt oxide is added, the anti-stress properties and the temperature characteristic are degraded by contraries. For this reason, it is preferred not to add cobalt oxide. However, it may be added as required (for example, for increasing Q of an Ni—Cu system ferrite in a high-frequency region). Even in this case, however, the content of cobalt oxide on the basis of the main component is preferably 0.09% by weight or less as CoO.

While the ferrite of the present invention can be a ferrite which contains at least iron oxide and nickel oxide as a main component, particularly preferably, it is an Ni—Cu—Zn system ferrite or an Ni—Cu system ferrite. When the ferrite is an Ni—Cu—Zn system ferrite, the main component thereof contains copper oxide and zinc oxide in addition to the above oxides. When the copper oxide and the zinc oxide are taken as CuO and ZnO, respectively, the contents of the main component are preferably as follows.

$Fe_2O_3$: 30 to 50 mol %

NiO: 15 to 40 mol %

CuO: 0.5 to 15 mol %

ZnO: 1 to 30 mol %

Further, when the ferrite is an Ni—Cu system ferrite, the contents of the main component thereof are preferably as follows.

Fe$_2$O$_3$: 30 to 50 mol %
CuO: 0.5 to 10 mol %
NiO: the rest

The Ni—Cu system ferrite has a high Q at a high frequency.

In the ferrite of the present invention, the relative temperature coefficient α$\mu$ir of the initial permeability $\mu$i can be decreased. The relative temperature coefficient a $\mu$ir is a value showing a change ratio of the initial permeability between two temperatures. For example, if the initial permeability at a temperature T$_1$ is $\mu$i$_1$ and if the initial permeability at a temperature T$_2$ is $\mu$i$_2$, α$\mu$ir is expressed by the following equation.

$$\alpha \mu ir = \frac{\mu i_2 - \mu i_1}{\mu i_1^2} \cdot \frac{1}{T_2 - T_1}$$

In the ferrite of the present invention, particularly in the Ni—Cu—Zn system ferrite of the present invention, α$\mu$ir between −20° C. and +60° C. can be decreased to within ±10 ppm/° C., and it can be also decreased to within ±5 ppm/° C. When α$\mu$ir is small, the initial permeability is not much affected by temperature, so that a machine and a device using the ferrite are improved in performance against use environments and are improved in reliability. On the other hand, while the α$\mu$ir of an Ni—Cu system ferrite is large as compared with an Ni—Cu—Zn system ferrite, the α$\mu$ir of Ni—Cu system ferrite between −20° C. and +60° C. can be decreased to within ±20 ppm/° C. by applying the present invention thereto. Generally, the frequency for measurement of the initial permeability is set at 100 kHz.

The ferrite of the present invention, particularly, the Ni—Cu—Zn system ferrite of the present invention is excellent in anti-stress properties. That is, the change in inductance when a stress is caused by an external force is small. For example, the inductance change ratio ΔL/L under a uniaxial pressure of 1 t/cm$^2$ can be adjusted to within ±5%, and it can be also adjusted to within ±3%. The above L refers to an inductance before a pressure is applied, and ΔL refers to a quantity of a change caused by the application of a pressure, i.e., a value obtained by deducting an inductance before the application of a pressure from an inductance during the application of the pressure. While an Ni—Cu system ferrite is poor in anti-stress properties as compared with an Ni—Cu—Zn system ferrite, the inductance change ratio ΔL/L of the Ni—Cu system ferrite under a uniaxial pressure of 0.5 t/cm$^2$ can be adjusted to within ±5%, also to within ±3%, by applying the present invention thereto. Since the ferrite of the present invention is excellent in anti-stress properties as explained above, the inductance change caused by resin molding can be decreased, and there can be obtained highly accurate electronic machines and devices.

The ferrite of the present invention is shaped and processed into a core material having a predetermined form, followed by winding of a necessary wiring and then by resin molding, and the so-prepared part is used as a fixed inductor, a chip inductor, or the like in various electronic machines and devices such as a television set, a video recorder and a mobile communication machine or device, e.g., a mobile phone or a car phone. While the form of the core is not specially limited, one example thereof is a drum type core of which the outer diameter and the length are both 2 mm or less long (e.g., 1.8 mm×1.5 mm).

The resin used as a molding material (covering material) is not specially limited. Examples of the resin include thermoplastic resins and thermosetting resins, and specific examples thereof include polyolefin, polyester, polyamide, polycarbonate, polyurethane, a phenolic resin, a urea resin and an epoxy resin. The molding material can be molded by means of dipping, application, spraying or the like. Injection molding or cast molding may be also used.

A typical example of an chip inductor for which the ferrite of the present invention is applied will be explained with reference to drawings.

FIG. 1 is a schematic view showing a constitution example of an chip inductor for which the ferrite of the present invention is applied. The chip inductor shown as a constitution example uses the ferrite of the present invention and has a core 1 having a large-diameter collar in each end, a winding 2 wound around a body of the core 1, a terminal electrode 6 for connecting an end of the wiring 2 and an external electric circuit and for fixing the core 1 within a resin (mold material) and a mold material 5 provided so as to cover the exterior of these.

The constitution of the chip inductor is not limited to the shown example, and can have various embodiments. For example, it may have a constitution in which a lead wire is connected from a central portion of a cylindrical axis of the core in the axial direction, and it may also have a constitution in which a core element formed by providing the core with a wiring, a lead wire, etc., is inserted into a box-shaped resin case and an opening portion is sealed with a mold material.

The method of production of the ferrite of the present invention will be explained hereinafter.

First, raw materials for the main component and raw materials for the additive are mixed. As raw materials for the main component, iron oxide (α-Fe$_2$O$_3$) and nickel oxide are used, and copper oxide, zinc oxide, etc., are used as required. As raw materials for the additive, those oxides specified for the additive, or various compounds which form the above additive by being calcined, are used. Preferably, the oxides are used, and it is particularly preferred to use the above oxides specified with regard to the explanation of calculation of the contents thereof. At this stage, raw materials for the first auxiliary component and the second auxiliary component may be mixed with the raw materials for the main component and the raw materials for the additive. As raw materials for the auxiliary components, the above oxides can be used. These raw materials are mixed so as to obtain the foregoing contents as a final composition.

Then, the above-prepared mixture is calcined. The calcining can be carried out in an oxidative atmosphere, generally in air. Preferably, the calcining temperature is between 800° C. and 1,000° C., and the calcining time period is 1 to 3 hours.

Then, the obtained calcined product is milled to a predetermined size with a ball mill, or the like. During the milling, the raw material for the first auxiliary component and the raw materials for the second auxiliary component may be added. Further, part of the raw materials for the auxiliary components may be added before the calcining, and the remainder thereof may be added after the calcining.

The above milled calcined product is shaped into a desired form by adding a proper amount of a proper binder such as polyvinyl alcohol.

Then, the so-obtained shaped body is fired. The firing can be carried out in an oxidative atmosphere, generally in air. Preferably, the firing temperature is approximately between 950° C. and 1,100° C., and the firing time period is 2 to 5 hours.

EXAMPLES

Example 1 (Ni—Cu—Zn system ferrite)

As raw materials, mixed powders containing Fe$_2$O$_3$, NiO, CuO and ZnO in a Fe2O$_3$:NiO:CuO:ZnO molar ratio of 48:30:4:18 and powders of $Bi_2O_3$, $V_2O_5$, $P_2O_5$, $SiO_2$, MgO, CaO, BaO and a talc [$Mg_3Si_4O_{10}(OH)_2$] were prepared. These powders as raw materials were weighed so as to have contents as shown in Table 1, and mixed in a ball mill for 5 hours. In Table 1, the contents of the additive, the first auxiliary component, the second auxiliary component and the talc are based on the content of the main component.

The above-obtained mixture was calcined in air at 900° C. for 2 hours, and then the calcined product was mixed and milled in a ball mill for 20 hours. The milled product was dried, and 1.0% by weight of polyvinyl alcohol was added. Then, the resultant mixture was shaped under a pressure of 1 t/cm² to obtain a rectangular shaped body having dimensions of 35 mm×7 mm×7 mm and a toroidal shaped body having an outer diameter of 20 mm, an inner diameter of 10 mm and a height of 5 mm. These shaped bodies were fired in air at a temperature shown in Table 1 for 2 hours, to give a rectangular core sample and a toroidal core sample both formed of the ferrite.

A wire was wound around the central portion of the rectangular core sample to form 20 windings, and a uniaxial compressive force was exerted thereon at a constant rate. In this case, inductance values were continuously measured with an LCR meter, and an inductance change ratio was calculated on the basis of the measurement values. Table 1 shows the inductance change ratio $\Delta L_1/L$ when a uniaxial pressure of 1 t/cm² was applied.

Further, a wire was wound around the toroidal core sample to form 20 windings. Then, inductance values, etc., were measured with an LCR meter, and a relative temperature coefficient ($\alpha\mu ir$) between −20° C. and +60° C. and an initial permeability ($\mu i$) at 100 kHz were determined. In addition, wires were wound around some samples to form 3 windings each, and Q ($Q_{10}$) at 10 MHz was determined. Table 1 shows the results.

As is clearly shown in Table 1, the samples of the present invention showed excellent values of both the anti-stress properties and temperature characteristic over the comparative samples.

Further, when 1 to 10% by weight of SrO was incorporated as a second auxiliary component, there were also obtained results which were nearly the same as those of the samples of the present invention shown in Table 1. Moreover, when $B_2O_3$ was used as an additive, there were also obtained results which were nearly the same as those of the samples of the present invention shown in Table 1.

Example 2 (Ni—Cu system ferrite)

Ni—Cu system ferrites having contents as shown in Table 2 were prepared in the same manner as in Example 1 except that the firing temperature was changed to those as shown in Table 2. In addition, the molar ratio of oxides in the main component of Sample No. 201 was $Fe_2O_3$:NiO:CuO= 48.5:49.5:2, and those of other Samples were $Fe_2O_3$:NiO:CuO=49:49:2.

These samples were measured in the same manner as in Example 1. Table 2 shows the results. In Table 2, however, inductance change ratios $\Delta L_{0.5}/L$ refer to values obtained by the application of a uniaxial pressure of 0.5 t/cm², and $Q_{100}$ refers to Q at 100 MHz.

TABLE 1

(Ni—Cu—Zn system ferrite)

| Sample No. | Contents (wt %) | | | | | | | | Firing temperature (° C.) | Properties or characteristic | | | |
|---|---|---|---|---|---|---|---|---|---|---|---|---|---|
| | Additive | | | First auxiliary component | Second auxiliary component | | | Talc | | $\Delta L_1/L$ | $\alpha\mu ir$ | | |
| | $Bi_2O_3$ | $V_2O_5$ | $P_2O_5$ | $SiO_2$ | MgO | CaO | BaO | (Si, Mg) | | (%) | (ppm/° C.) | $\mu i$ | $Q_{10}$ |
| 101 | 1.0 | — | — | 3.75 | — | 2.1 | — | — | 1090 | +0.1 | −7.1 | 49.0 | 29 |
| 102 | 3.0 | — | — | 3.75 | — | 2.1 | — | — | 1060 | +2.1 | −7.0 | 48.0 | — |
| 103 | — | 1.0 | — | 2.5 | — | 1.4 | — | — | 1090 | +0.7 | +4.0 | 56.0 | — |
| 104 | — | 3.0 | — | 5.0 | — | 2.8 | — | — | 1060 | +2.0 | −3.1 | 28.0 | 58 |
| 105 | 1.0 | — | — | 3.75 | 1.0 | — | — | — | 1030 | −1.1 | +6.5 | 47.0 | — |
| 106 | 3.0 | — | — | 10.0 | 10.0 | — | — | — | 1030 | −0.1 | −5.1 | 26.0 | — |
| 107 | 3.0 | — | — | 5.0 | 5 | — | — | — | 1060 | −4.8 | +0.7 | 52.0 | 146 |
| 108 | 1.0 | — | — | 5.0 | — | — | 3.9 | — | 1030 | −2.7 | −0.9 | 28.0 | — |
| 109 | — | — | 3.0 | 3.5 | 3.5 | — | — | — | 1030 | −1.3 | +8.0 | 43.0 | — |
| 110 | 2.0 | — | — | — | — | — | — | 2.0 | 1000 | +1.6 | −2.3 | 53.0 | — |
| 111** | — | — | — | — | — | — | — | — | 1030 | −15.1* | +26.7* | 144.0 | 4 |
| 112** | 5.0 | — | — | — | — | — | — | — | 1090 | −6.1* | +27.5* | 151.0 | 9 |
| 113** | 10.0 | — | — | — | — | — | — | — | 1030 | −3.8 | +20.0* | 106.0 | 9 |
| 114** | — | — | — | 5.0 | — | — | — | — | 1030 | −17.6* | +14.9* | 26.3 | — |
| 115** | 10.0 | — | — | 6.0 | — | — | — | — | 1030 | −9.6* | −2.5 | 31.8 | — |
| 116** | — | — | — | — | — | — | — | 10.0 | 1000 | −7.1* | −5.0 | 8.0 | — |

*Property or characteristic value outside preferred range
**Comparative

TABLE 2

Ni—Cu system ferrite

| Sample No. | Additive | | | First auxiliary component | Second auxiliary component | | | Talc | CoO | Firing temperature (° C.) | Properties or characteristic | | | |
|---|---|---|---|---|---|---|---|---|---|---|---|---|---|---|
| | $Bi_2O_3$ | $V_2O_5$ | $P_2O_5$ | $SiO_2$ | MgO | CaO | BaO | (Si, Mg) | | | $\Delta L_{0.5}/L$ (%) | $\alpha\mu ir$ (ppm/° C.) | $\mu i$ | $Q_{100}$ |
| 201 | 6.0 | — | — | — | — | — | — | 2.0 | — | 1030 | −3.0 | 11 | 9.0 | 87 |
| 202 | 6.0 | — | — | — | — | — | — | 2.0 | — | 1030 | −2.1 | 4 | 8.7 | 89 |
| 203 | 6.0 | — | — | — | — | — | — | 2.0 | 0.02 | 1030 | −2.3 | 19 | 8.6 | 100 |
| 204 | 6.0 | — | — | — | — | — | — | 2.0 | 0.04 | 1030 | −2.1 | 15 | 8.8 | 86 |
| 205 | 6.0 | — | — | — | — | — | — | 2.0 | 0.06 | 1030 | −2.7 | 20 | 8.7 | 115 |
| 206 | 6.0 | — | — | — | — | — | — | 2.0 | 0.08 | 1030 | −2.6 | 20 | 8.7 | 116 |
| 207 | 6.0 | — | — | — | — | — | — | 2.0 | 0.1 | 1030 | −3.2 | 37* | 8.2 | 130 |

*Property or characteristic value outside preferred range

Table 2 shows that the Ni—Cu system ferrite also materializes the effects of the present invention.

Effect of the Invention

The ferrite of the present invention materializes a high initial permeability, excellent anti-stress properties and excellent temperature characteristic without using lead. When the ferrite of the present invention is used, therefore, there is materialized a resin mold type inductor which has a narrow tolerance and high reliability and which causes no environmental pollution.

What is claimed is:

1. A ferrite which contains a main component containing at least iron oxide and nickel oxide, an additive containing at least one of bismuth oxide, vanadium oxide, phosphorus oxide and boron oxide, a first auxiliary component containing silicon oxide and a second auxiliary component containing at least one of magnesium oxide, calcium oxide, barium oxide and strontium oxide, wherein the content of the additive based on the main component is 0.5 to 15% by weight, the content of the first auxiliary component based on the main component is 0.1 to 10% by weight and the content of the second auxiliary component based on the main component is 0.1 to 10% by weight, provided that the iron oxide is taken as $Fe_2O_3$, that the nickel oxide is taken as NiO, that the bismuth oxide is taken as $Bi_2O_3$, that vanadium oxide is taken as $V_2O_5$, that the phosphorus oxide is taken as $P_2O_5$, that the boron oxide is taken as $B_2O_3$, that the silicon oxide is taken as $SiO_2$, that the magnesium oxide is taken as MgO, that the calcium oxide is taken as CaO, that barium oxide is taken as BaO and further that the strontium oxide is taken as SrO, respectively, wherein the second auxiliary component contains at least magnesium oxide, and wherein the silicon oxide as the first auxiliary component and the magnesium oxide as a second auxiliary component are incorporated in the form of a talc ($Mg_3Si_4O_{10}(OH)_2$, and in an amount of 0.5 to 8% by weight based on the main component.

2. The ferrite of claim 1, wherein the ferrite is an Ni—Cu—Zn system ferrite.

3. The ferrite of claim 2, wherein the ferrite has an inductance change ratio of within ±5% when a pressure of 1 t/cm$^2$ is applied.

4. The ferrite of claim 2, wherein the ferrite has a relative temperature coefficient of initial permeability of within ±10 ppm/° C. in a temperature range of from −20 to +60° C.

5. The ferrite of claim 1, wherein the ferrite is an Ni—Cu system ferrite.

6. The ferrite of claim 5, wherein the ferrite has an inductance change ratio of within ±5% when a pressure of 0.5 t/cm$^2$ is applied.

7. The ferrite of claim 5, wherein the ferrite has a relative temperature coefficient of initial permeability of is within ±20 ppm/° C. in a temperature range of from −20 to +60° C.

8. An inductor having a core formed of claim 1, the core being resin-molded.

9. A ferrite which contains a main component containing at least iron oxide and nickel oxide, an additive containing at least one of bismuth oxide, vanadium oxide, phosphorus oxide and boron oxide, a first auxiliary component containing silicon oxide and a second auxiliary component containing at least one of magnesium oxide, calcium oxide, barium oxide and strontium oxide, wherein the content of the additive based on the main component is 0.5 to 15% by weight, the content of the first auxiliary component based on the main component is 0.1 to 10% by weight and the content of the second auxiliary component based on the main component is 0.1 to 10% by weight, provided that the iron oxide is taken as $Fe_2O_3$, that the nickel oxide is taken as NiO, that the bismuth oxide is taken as $Bi_2O_3$, that vanadium oxide is taken as $V_2O_5$, that the phosphorus oxide is taken as $P_2O_5$, that the boron oxide is taken as $B_2O_3$, that the silicon oxide is taken as $SiO_2$, that the magnesium oxide is taken as MgO, that the calcium oxide is taken as CaO, that barium oxide is taken as BaO and further that the strontium oxide is taken as SrO, respectively, and wherein the ferrite is a Ni—Cu system ferrite.

10. The ferrite of claim 9, wherein the ferrite has an inductance change ratio of within ±5% when a pressure of 0.5 t/cm$^2$ is applied.

11. The ferrite of claim 9, wherein the ferrite has a relative temperature coefficient of initial permeability of within ±20 ppm/° C. in a temperature range of from −20 to +60° C.

12. An inductor having a core formed of the ferrite of claim 9, the core being resin-molded.

* * * * *

UNITED STATES PATENT AND TRADEMARK OFFICE
CERTIFICATE OF CORRECTION

PATENT NO. : 6,033,594
DATED : March 7, 2000
INVENTOR(S) : Yasushi ENOKIDO, ET AL.

It is certified that error appears in the above-identified patent and that said Letters Patent is hereby corrected as shown below:

Column 10, line 28 "is within" should read --within--.

Signed and Sealed this

Twenty-fourth Day of April, 2001

Attest:

NICHOLAS P. GODICI

Attesting Officer     Acting Director of the United States Patent and Trademark Office